US009456122B2

(12) United States Patent
Daon et al.

(10) Patent No.: US 9,456,122 B2
(45) Date of Patent: Sep. 27, 2016

(54) SYSTEM AND METHOD FOR FOCUSING IMAGING DEVICES

(71) Applicant: Navigate Surgical Technologies, Inc., Vancouver (CA)

(72) Inventors: Ehud (Udi) Daon, North Vancouver (CA); Martin Gregory Beckett, Bowen Island (CA); Christopher Black, West Vancouver (CA)

(73) Assignee: Navigate Surgical Technologies, Inc., Vancouver, BC (CA)

( * ) Notice: Subject to any disclaimer, the term of this patent is extended or adjusted under 35 U.S.C. 154(b) by 0 days.

(21) Appl. No.: 14/458,186

(22) Filed: Aug. 12, 2014

(65) Prior Publication Data

US 2015/0049238 A1 Feb. 19, 2015

Related U.S. Application Data

(60) Provisional application No. 61/865,581, filed on Aug. 13, 2013.

(51) Int. Cl.
*H04N 5/222* (2006.01)
*H04N 5/232* (2006.01)
(Continued)

(52) U.S. Cl.
CPC ...... *H04N 5/23212* (2013.01); *G06K 9/00624* (2013.01); *H04N 1/00339* (2013.01); *H04N 5/2224* (2013.01); *H04N 5/2254* (2013.01)

(58) Field of Classification Search
CPC ........... H04N 5/23212; H04N 5/2224; H04N 5/2254; H04N 1/00461; H04N 1/00339; H04N 1/00342; G06K 9/00624
USPC ............... 348/169–173, 208.14, 208.12, 345
See application file for complete search history.

(56) References Cited

U.S. PATENT DOCUMENTS 5,230,623 A 7/1993 Guthrie
5,438,991 A 8/1995 Yu et al.
(Continued)

FOREIGN PATENT DOCUMENTS

DE 10 2005 026654 12/2006
DE 2009009158 9/2010
(Continued)

OTHER PUBLICATIONS

Japanese Patent Office (JPO) Notice of Preliminary Rejection,Japan Patent Application No. 2014-537811, Based upon PCT/IL2012/000363, Jan. 25, 2016, which claims priority to U.S. Appl. No. 13/571,284, now U.S. Pat. No. 8,938,282.
(Continued)

*Primary Examiner* — Hung Lam
(74) *Attorney, Agent, or Firm* — Kevin R. Erdman; Brannon Sowers & Cracraft PC (57) ABSTRACT

A system and method for automatically focusing imaging devices on an imaging set employs at least one tracker and two or more tracking markers, each tracking marker having an identification means and a tracking pattern. The tracking markers are configured for attaching to the imaging devices and to corresponding subjects to be imaged. A tracker gathers image information of the imaging set and provides it to a controller, which compares the image information to predetermined stored information about the tracking patterns of the various tracking markers. The tracking markers are identified and their three-dimensional positions determined. The distances between the imaging devices and the subjects are determined and the distances between the imaging devices and the subjects are calculated. This provides the focus setting information for communication to the imaging devices. The tracking patterns may have no rotational symmetry, allowing the orientation of subjects to be determined.

12 Claims, 8 Drawing Sheets

(51) Int. Cl.
  *H04N 5/225* (2006.01)
  *H04N 1/00* (2006.01)
  *G06K 9/00* (2006.01)

(56) References Cited

U.S. PATENT DOCUMENTS

| | | | |
|---|---|---|---|
| 5,603,318 | A | 2/1997 | Heilbrun et al. |
| 5,828,770 | A | 10/1998 | Leis et al. |
| 5,967,777 | A | 10/1999 | Klein |
| 6,122,541 | A | 9/2000 | Cosman et al. |
| 6,359,647 | B1* | 3/2002 | Sengupta ......... G08B 13/19608 348/143 |
| 6,468,265 | B1 | 10/2002 | Evans et al. |
| 6,529,765 | B1 | 3/2003 | Franck et al. |
| 7,653,455 | B2 | 1/2010 | Cinador |
| 7,720,521 | B2 | 5/2010 | Chang |
| 7,758,345 | B1 | 7/2010 | Christensen |
| 7,894,878 | B2 | 2/2011 | Noujeim |
| 7,899,512 | B2 | 3/2011 | Labadie |
| 8,172,573 | B2 | 5/2012 | Sonenfeld |
| 2003/0108334 | A1* | 6/2003 | Nevenka ............ G06F 17/30787 386/224 |
| 2004/0002642 | A1 | 1/2004 | Dekel et al. |
| 2004/0097952 | A1 | 5/2004 | Sarin et al. |
| 2004/0138556 | A1 | 7/2004 | Cosman |
| 2004/0164858 | A1* | 8/2004 | Lin .................. G08B 13/19608 340/522 |
| 2005/0085719 | A1 | 4/2005 | Franklin et al. |
| 2005/0163342 | A1 | 7/2005 | Persky |
| 2005/0182318 | A1 | 8/2005 | Kaji et al. |
| 2006/0142657 | A1 | 6/2006 | Quaid et al. |
| 2006/0165310 | A1 | 7/2006 | Mack |
| 2006/0212044 | A1 | 9/2006 | Bova et al. |
| 2006/0247517 | A1 | 11/2006 | Labadie et al. |
| 2006/0281991 | A1 | 12/2006 | Fitzpatrick et al. |
| 2007/0208252 | A1 | 9/2007 | Makower |
| 2007/0223910 | A1 | 9/2007 | Aoki |
| 2007/0253541 | A1 | 11/2007 | Sukovic et al. |
| 2008/0026338 | A1 | 1/2008 | Cinader |
| 2008/0135733 | A1 | 6/2008 | Feilkas |
| 2008/0161682 | A1 | 7/2008 | Kendrick et al. |
| 2008/0171305 | A1 | 7/2008 | Sonenfeld et al. |
| 2008/0183071 | A1 | 7/2008 | Strommer et al. |
| 2008/0193896 | A1 | 8/2008 | Yang |
| 2008/0200927 | A1 | 8/2008 | Hartmann et al. |
| 2008/0262345 | A1 | 10/2008 | Fichtinger et al. |
| 2008/0319491 | A1 | 12/2008 | Schoenefeld |
| 2009/0012509 | A1 | 1/2009 | Csavoy |
| 2009/0171196 | A1 | 7/2009 | Olson et al. |
| 2009/0253095 | A1 | 10/2009 | Salcedo |
| 2010/0002084 | A1* | 1/2010 | Hattori ................. G11B 27/034 348/207.1 |
| 2010/0039506 | A1 | 2/2010 | Sarvestani et al. |
| 2010/0049195 | A1 | 2/2010 | Park et al. |
| 2010/0168562 | A1 | 7/2010 | Zhao et al. |
| 2010/0168763 | A1 | 7/2010 | Zhao et al. |
| 2010/0210939 | A1 | 8/2010 | Hartmann et al. |
| 2010/0217139 | A1 | 8/2010 | Pinter et al. |
| 2010/0298712 | A1 | 11/2010 | Pelissier et al. |
| 2011/0008751 | A1 | 1/2011 | Pattersson |
| 2011/0087332 | A1 | 4/2011 | Bojarski et al. |
| 2011/0217667 | A1 | 9/2011 | Groscruth |
| 2011/0257653 | A1 | 10/2011 | Hughes |
| 2012/0065496 | A1 | 3/2012 | Stratton |
| 2012/0115107 | A1 | 5/2012 | Adams |
| 2012/0259204 | A1 | 10/2012 | Carrat et al. |
| 2012/0265051 | A1 | 10/2012 | Fischer et al. |
| 2012/0283637 | A1 | 11/2012 | Cohen |
| 2013/0063558 | A1 | 3/2013 | Phipps |
| 2013/0258353 | A1 | 10/2013 | Kosmecki et al. |
| 2014/0030669 | A1 | 1/2014 | Hey et al. |
| 2015/0138427 | A1* | 5/2015 | Kennedy ............ H04N 5/23206 348/345 |

FOREIGN PATENT DOCUMENTS

| | | |
|---|---|---|
| DE | 102009009158 | 9/2010 |
| DE | 2010042540 | 4/2012 |
| DE | 102011012460 | 8/2012 |
| EP | 1527417 | 9/2011 |
| FR | 2 929 794 | 10/2009 |
| GB | 2 416 949 | 2/2006 |
| JP | 2000046546 | 2/2000 |
| JP | 2007253748 | 10/2007 |
| JP | 2009172411 | 5/2009 |
| WO | 99/27839 | 6/1999 |
| WO | 02/076302 | 10/2002 |
| WO | 2008/009136 | 1/2008 |
| WO | 2010/086374 | 5/2010 |
| WO | 2011/109041 | 9/2011 |
| WO | 2011/113441 | 9/2011 |
| WO | 2013144939 | 4/2012 |
| WO | 2012068679 | 5/2012 |
| WO | 2012095642 | 7/2012 |
| WO | 2012/149548 | 11/2012 |
| WO | 2012149548 | 11/2012 |
| WO | 2013096766 | 6/2013 |
| WO | 2011109041 | 10/2013 |
| WO | 2013144208 | 10/2013 |

OTHER PUBLICATIONS

Japanese Patent Office (JPO) Notice of Preliminary Rejection,Japanese Patent Application No. 2015-541159, Based upon PCT/EP2013/0073401, Mar. 1, 2016, which claims priority to U.S. Appl. No. 14/562,691, now U.S. Pat. No. 8,908,918.
USPTO, Non-Final Office Action for U.S. Appl. No. 13/822,358, dated Feb. 13, 2015.
USPTO, Response to Non-Final Office Action for U.S. Appl. No. 13/745,763, dated Mar. 25, 2015.
European Patent Office, International Search Report, dated Sep. 3, 2013 (PCT/IL2013/000032).
European Patent Office, International Written Opinion, dated Sep. 3, 2013 (PCT/IL2013/000032).
European Patent Office, International Search Report, dated Sep. 16, 2013 (PCT/EP2013/056525).
European Patent Office, International Search Report, mailed Sep. 17, 2013 (PCT/IL2013/000031).
Applicants Attorney, Prosecution of U.S. Appl. No. 13/571,284, from First Office Action of Aug. 15, 2013 to Amendment with Request for Continued Examination of Feb. 26, 2014.
European Patent Office, International Search Report, mailed Mar. 4, 2013 (PCT/IL2012/000363).
European Patent Office, International Written Opinion, mailed Mar. 4, 2013 (PCT/IL2012/000363).
European Patent Office, International Search Report, dated Feb. 18, 2014 (PCT/EP2013/073416).
European Patent Office, International Written Opinion, dated Feb. 18, 2014 (PCT/EP2013/073416).
European Patent Office, International Search Report, International Application No. PCT/EP2013/073401, Navigate Surgical Technologies, Inc., Mar. 19, 2014.
European Patent Office, Written Opinion of the International Searching Authority, International Application No. PCT/EP2013/073401, Navigate Surgical Technologies, Inc., Mar. 19, 2014.
European Patent Office, Written Opinion of the International Searching Authority, International Application No. PCT/IL2015/050400, Navigate Surgical Technologies, Inc., Jul. 16, 2015.
European Patent Office, International Search Report, International Application No. PCT/IL2015/050400, Navigate Surgical Technologies, Inc., Jul. 16, 2015.
USPTO, Non-Final Office Action for U.S. Appl. No. 13/744,967, dated Jun. 30, 2015.
USPTO, Non-Final Office Action for U.S. Appl. No. 13/745,249, dated Jun. 30, 2015.
USPTO, Final Office Action for U.S. Appl. No. 13/745,763, dated Jul. 8, 2015.

(56) References Cited

OTHER PUBLICATIONS

Arizona Center for Laser Dentistry, Root Canals at the Arizona Center for Laser Dentistry, Captured via web.archive.org on Dec. 19, 2010, retrieved Jun. 2, 2015.
International Search Report and Written Opinion for PCT/EP2014/067279, dated Nov. 10, 2014.
International Search Report and Written Opinion for PCT/EP2014/067280, dated Oct. 27, 2014.
Office Action in related U.S. Appl. No. 13/735,487 dated Nov. 14, 2014.
Office Action in related U.S. Appl. No. 13/745,763 dated Dec. 29, 2014.
European Patent Office, International Written Opinion, dated Sep. 29, 2014 (PCT/IB2014/060403).
European Patent Office, International Written Opinion, dated Oct. 17, 2014 (PCT/EP2014/067280).
European Patent Office, International Search Report, dated Jul. 17, 2014 (PCT/EP2014/058406).
European Patent Office, International Written Opinion, dated Aug. 18, 2014 (PCT/EP2014/058406).
European Patent Office, International Written Opinion, dated Jul. 30, 2014 (PCT/EP2014/057656).
European Patent Office, International Written Opinion, dated Jul. 30, 2014 (PCT/EP2014/060018).

* cited by examiner

SYSTEM AND METHOD FOR FOCUSING IMAGING DEVICES

CROSS-REFERENCE TO RELATED APPLICATIONS

The present application claims priority under 35 U.S.C. §119 of United States Provisional Patent Application Ser. No. 61/865,581, filed Aug. 13, 2013, the disclosures of which are incorporated by reference herein.

BACKGROUND OF THE INVENTION

1. Field of the Invention

The invention relates to location monitoring hardware and software systems. More specifically, the field of the invention is that of systems and methods for tracking and focusing imaging devices.

2. Description of the Related Art

One on the greatest challenges in photography, especially moving picture photography or videography, is that of managing the focus of the relevant imaging devices. At the most fundamental level, the depth of focus of the imaging device can be made as great as possible, thereby to allow all objects within the scene of interest to remain in focus. While this "deep focus" technique works well for panoramic outdoor scenes bathed in large amounts of light, the large f-numbers required for the necessary depth of focus demand massive amounts of light. As a result, this approach is not feasible for scenes with less light or "moody" scenes. Cinematographers also set great store by their ability to precisely manage the focus of scenes, as this has great impact on the actual "movie experience". Maintaining a very large depth of focus is therefore not a method used extensively for general videography or cinematography. It is in the rest of the videography or cinematography, beyond "deep focus", that the main challenge in focusing is to be found. Over the past few decades several methods have been developed to address this challenge. These fall mainly into two categories.

The first category comprises methods based on analyzing the image, or a part of it, on a continuous basis and to adjust the focus of the camera based on the change in focus or contrast in the image produced within the imaging device. There is a considerable range of implementations of this basic concept, some working more reliably than others. Most of these methods suffer from the difficulty of determining whether the imaging device is focused in front of or beyond the subject of interest. This results from the fact that either condition produces a decrease in contrast or a loss of focus. While some more sophisticated techniques tend to address this phenomenon to some degree, it remains a debilitating issue. As a result, automatic focus systems, more commonly known as "autofocus" systems, tend to "hunt" for focus. This can have hugely debilitating consequences for shooting scenes in which the subject is moving.

A considerable amount of data processing is associated with these focus-based autofocus systems. The availability of ever lower cost and higher speed processors makes the implementation of these systems ever more attractive, particularly in consumer photography and videography. However, even with these advances the slow hunt for focus by many autofocus systems remains a frustrating aspect of photography and videography.

A second category of focus methods is based on distance measurement. The most popular of these is the use of an ultrasonic rangefinder on the imaging device to determine the distance to the subject. This works well for subjects that are at very distinct distances and positions with respect to their surroundings, but these techniques struggle in environments where there is clutter. Fundamentally, the resolution of the technology is not adequate to the challenge of photographing or videographing a subject, say an actor, in a room full of objects, particularly of the subject or actor is moving through that environment. Given that the ultrasonic beam is not visible to the naked eye, there is considerable difficulty in directing and tracking it.

A need therefore remains for a reliable method of focusing imaging devices based on the position of the subject of interest within a scene or environment, particularly if the subject is moving through the scene or environment.

SUMMARY OF THE INVENTION

In a first aspect of the invention a system is presented for automatically adjusting a focus setting of at least one imaging device on an imaging set, the system comprising: two or more tracking markers, each tracking marker comprising an identification means and a tracking pattern, the two or more tracking markers configured for attaching to the at least one imaging device and to corresponding one or more subjects to be imaged on the imaging set by the at least one imaging device; a first tracker disposed proximate the imaging set to gather first image information of the imaging set, the first tracker having a field of view including the at least one imaging device and the one or more subjects; a controller configured for receiving the first image information from the first tracker and for communicating to the at least one imaging device control signals for the adjusting of focus settings for the at least one imaging device based on distances between the at least one imaging device and the one or more subjects; and a database comprising predetermined information about the two or more identities and two or more tracking patterns of the corresponding two or more tracking markers.

The controller may be further configured for communicating the control signals based on the distances between the at least one imaging device and the one or more subjects. The controller may be further configured for comparing the first image information with the predetermined information; identifying from the first image information the two or more tracking markers; determining the three-dimensional locations of the two or more tracking markers; and determining distances between the at least one imaging device and the one or more subjects. The one or more subjects may comprise two or more subjects and the controller may be further configured for determining a required depth of focus from the distances between the at least one imaging device and the two or more subjects, and for communicating the control signals based on the required depth of focus for the at least one imaging device.

The tracking pattern of each of the two or more tracking markers may have no rotational symmetry. The tracking pattern of each of the two or more tracking markers comprises a plurality of contrasting portions. At least one of the contrasting portions may have a perimeter comprising a mathematically describable curved section. The perimeter of the at least one contrasting portion may comprise a conic section. The conic section may be one of an ellipse and a circle.

The system may additionally comprise at least one further tracker disposed proximate the imaging set to gather further image information of the imaging set, the at least one further tracker having a field of view including the two or more tracking markers; and the controller may be further configured for receiving the further image information from the at least one further tracker and for communicating to the at least one imaging device control signals for the adjusting of focus settings for the at least one imaging device based on distances between the at least one imaging device and the one or more subjects.

In a further embodiment a system for automatically adjusting a focus setting of an imaging device on an imaging set comprises: one or more tracking markers, each tracking marker comprising an identification means and a tracking pattern, the one or more tracking markers configured for attaching to corresponding one or more subjects to be imaged on the imaging set by the at least one imaging device; a first tracker integrated with the imaging device to gather first image information of the imaging set, the first tracker having a field of view including the one or more subjects; a controller configured for receiving the first image information from the first tracker and for communicating to the imaging device control signals for the adjusting of focus settings for the imaging device based on distances between the imaging device and the one or more subjects; and a database comprising predetermined information about one or more corresponding identities and one or more corresponding tracking patterns of the one or more tracking markers.

The controller may be further configured for communicating the control signals based on the distances between the imaging device and the one or more subjects. The controller may be further configured for comparing the first image information with the predetermined information; identifying from the first image information the one or more tracking markers; determining three-dimensional locations of the one or more tracking markers; and determining distances between the imaging device and the one or more subjects.

In some embodiments the one or more subjects may comprise two or more subjects and the controller may be further configured for determining a required depth of focus from the distances between the imaging device and the two or more subjects, and for communicating the control signals based on the required depth of focus for the imaging device.

In a further aspect of the invention a method is provided for automatically adjusting a focus setting of at least one imaging device on an imaging set, the method comprising: attaching two or more tracking markers to the at least one imaging device and to corresponding one or more subjects on the imaging set, each tracking marker comprising an identification means and a tracking pattern; disposing proximate the imaging set a first tracker to gather first image information of the imaging set; setting a field of view for the first tracker to include the at least one imaging device and the one or more tracking markers; supplying to a controller the first image information from the first tracker; determining focus settings for the at least one imaging device based on the first image information and predetermined information in a database about the two or more identities and two or more tracking patterns of the corresponding two or more tracking markers; communicating from the controller to the at least one imaging device control signals for the adjusting of the focus settings for the at least one imaging.

The determining focus settings for the at least one imaging device may comprise: identifying from the first image information the two or more tracking markers; determining the three-dimensional locations of the two or more tracking markers; determining distances between the at least one imaging device and the one or more subjects; and determining the focus settings for the at least one imaging device based on the distances between the at least one imaging device and the one or more subjects. The method may further comprise determining a required depth of focus for the at least one imaging device from the distances between the at least one imaging device and the two or more subjects, and communicating to the at least one imaging device the control signals based on the required depth of focus for the at least one imaging device.

Each tracking pattern may comprise at least one contrasting portion and the determining the three-dimensional locations of the two or more tracking markers may comprise determining a contrasting portion reference point for each of the two or more tracking markers. The at least one contrasting portion may have a perimeter that comprises a mathematically describable curved section and determining a contrasting portion reference point for each of the two or more tracking markers may comprise determining a contrasting portion reference point relative to the mathematically describable curved section. The mathematically describable curved section may be a circle, and determining a contrasting portion reference point may comprise determining a center of the circle. The mathematically describable curved section may be an ellipse, and determining a contrasting portion reference point may comprise determining a center of the ellipse.

The method may further comprise: disposing at least one further tracker proximate the imaging set; setting the at least one further tracker to have a field of view including the two or more tracking markers; gathering from the at least one further tracker further image information of the imaging set; supplying to the controller the further image information from the at least one further tracker; and communicating to the at least one imaging device control signals for the adjusting of focus settings for the at least one imaging device based on distances between the at least one imaging device and the one or more subjects.

With the imaging device functioning as tracker in some embodiments, the associated method for automatically adjusting a focus setting of the imaging device on the imaging set comprises attaching one or more tracking markers to corresponding one or more subjects on the imaging set, each tracking marker comprising an identification means and a tracking pattern; disposing the imaging device to have a field of view to include the one or more tracking markers on the imaging set; obtaining from the imaging device first image information of the imaging set; determining focus settings for the imaging device based on the first image information and predetermined information in a database about one or more identities and one or more tracking patterns corresponding to the one or more tracking markers; adjusting the imaging device based on the focus settings. As already described above, the determining of the three-dimensional locations of the one or more tracking markers may comprise determining a contrasting portion reference point for each of the one or more tracking markers.

With the imaging device functioning as tracker in some embodiments, the determining of the focus settings for the imaging device may comprise: identifying from the first image information the one or more tracking markers; determining the three-dimensional locations of the one or more tracking markers; determining distances between the imaging device and the one or more subjects; and determining the focus settings for the imaging device based on the distances between the imaging device and the one or more subjects. The method may further comprise determining a required depth of focus for the imaging device from the distances between the imaging device and the one or more subjects, and adjusting the imaging device the control signals based on the required depth of focus.

The method may further comprise disposing at least one tracker proximate the imaging set; configuring the at least one tracker to have a field of view including the one or more tracking markers; gathering from the at least one tracker further image information of the imaging set; determining further focus settings for the imaging device based on the further image information and predetermined information in a database about the one or more identities and the one or more tracking patterns corresponding to the one or more tracking markers; and adjusting the imaging device based on the further focus settings.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein.

Corresponding reference characters indicate corresponding parts throughout the several views. Although the drawings represent embodiments of the present invention, the drawings are not necessarily to scale and certain features may be exaggerated in order to better illustrate and explain the present invention. The flow charts and screen shots are also representative in nature, and actual embodiments of the invention may include further features or steps not shown in the drawings. The exemplification set out herein illustrates an embodiment of the invention, in one form, and such exemplifications are not to be construed as limiting the scope of the invention in any manner.

DESCRIPTION OF EMBODIMENTS OF THE PRESENT INVENTION

The embodiments disclosed below are not intended to be exhaustive or limit the invention to the precise form disclosed in the following detailed description. Rather, the embodiments are chosen and described so that others skilled in the art may utilize their teachings.

The detailed descriptions that follow a computer generally includes a processor for executing instructions and memory for storing instructions and data, including interfaces to obtain and process imaging data. When a general-purpose computer has a series of machine encoded instructions stored in its memory, the computer operating on such encoded instructions may become a specific type of machine, namely a computer particularly configured to perform the operations embodied by the series of instructions. Some of the instructions may be adapted to produce signals that control operation of other machines and thus may operate through those control signals to transform materials far removed from the computer itself.

Certain aspects of the present invention also relate to a control apparatus or "controller" for performing different operations. This apparatus may be specifically constructed for the required purposes or it may comprise a general-purpose computer as selectively activated or reconfigured by a computer program stored in the computer. Any algorithms presented herein are not inherently related to any particular computer or other apparatus unless explicitly indicated as requiring particular hardware. In some cases, the computer programs may communicate or relate to other programs or equipment through signals configured to particular protocols, which may or may not require specific hardware or programming to interact. In particular, various general-purpose machines may be used with programs written in accordance with the teachings herein, or it may prove more convenient to construct more specialized apparatus to perform the required method steps. The required structure for a variety of these machines will appear from the description below.

In the following description, several terms that are used frequently have specialized meanings in the present context. The terms "network", "local area network", "LAN", "wide area network", or "WAN" mean two or more computers and/or controllers that are connected in such a manner that messages may be transmitted between the computers and/or controllers. In such computer networks, typically one or more computers operate as a "server", a computer with large storage devices such as hard disk drives and communication hardware to operate peripheral devices such as printers or modems. Other computers, termed "workstations", provide a user interface so that users of computer networks may access the network resources, such as shared data files, common peripheral devices, and inter-workstation communication. Users activate computer programs or network resources to create "processes" which include both the general operation of the computer program along with specific operating characteristics determined by input variables and its environment. Similar to a process is an agent (sometimes called an intelligent agent), which is a process that gathers information or performs some other service without user intervention and on some regular schedule. Typically, an agent, using parameters typically provided by the user, searches locations either on the host machine or at some other point on a network, gathers the information relevant to the purpose of the agent, and presents it to the user on a periodic basis.

When a network computer needs a network resource, which typically requires an application program to execute on the remote server, the network computer calls an Application Program Interface, or "API", to allow the user to provide commands to the network resource and observe any output. The term "Browser" refers to a program which is not necessarily apparent to the user, but which is responsible for transmitting messages between the desktop and the network server and for displaying and interacting with the network user. Browsers are designed to utilize a communications protocol for transmission of text and graphic information over a worldwide network of computers, namely the "World Wide Web" or simply the "Web". Examples of Browsers compatible with the present invention include the Internet Explorer program sold by Microsoft Corporation (Internet Explorer is a trademark of Microsoft Corporation), the Opera Browser program created by Opera Software ASA, or the Firefox browser program distributed by the Mozilla Foundation (Firefox is a registered trademark of the Mozilla Foundation). Although the following description details such operations in terms of a graphic user interface of a Browser, the present invention may be practiced with text based interfaces, or even with voice or visually activated interfaces, that have many of the functions of a graphic based Browser.

Browsers display information, which is formatted in a Standard Generalized Markup Language ("SGML") or a HyperText Markup Language ("HTML"), both being scripting languages, which embed non-visual codes in a text document through the use of special ASCII text codes. Files in these formats may be easily transmitted across computer networks, including global information networks like the Internet, and allow the Browsers to display text, images, and play audio and video recordings. The Web utilizes these data file formats to conjunction with its communication protocol to transmit such information between servers and workstations. Browsers may also be programmed to display information provided in an eXtensible Markup Language ("XML") file, with XML files being capable of use with several Document Type Definitions ("DTD") and thus more general in nature than SGML or HTML. The XML file may be analogized to an object, as the data and the stylesheet formatting are separately contained (formatting may be thought of as methods of displaying information, thus an XML file has data and an associated method).

The terms "wireless wide area network" or "WWAN" mean a wireless network that serves as the medium for the transmission of data between a handheld device and a computer. The term "synchronization" means the exchanging of information between a first device, e.g. a handheld device, and a second device, e.g. a desktop computer, either via wires or wirelessly. Synchronization ensures that the data on both devices are identical (at least at the time of synchronization). In wireless wide area networks, communication primarily occurs through the transmission of radio signals over analog, digital cellular, or personal communications service ("PCS") networks. Signals may also be transmitted through microwaves and other electromagnetic waves. At the present time, most wireless data communication takes place across cellular systems using second generation technology such as code-division multiple access ("CDMA"), time division multiple access ("TDMA"), the Global System for Mobile Communications ("GSM"), Third Generation (wideband or "3G"), Fourth Generation (broadband or "4G"), personal digital cellular ("PDC"), or through packet-data technology over analog systems such as cellular digital packet data (CDPD") used on the Advance Mobile Phone Service ("AMPS").

The terms "wireless application protocol" or "WAP" mean a universal specification to facilitate the delivery and presentation of web-based data on handheld and mobile devices with small user interfaces. "Mobile Software" refers to the software operating system, which allows for application programs to be implemented on a mobile device such as a mobile telephone or PDA. Examples of Mobile Software are Java and Java ME (Java and JavaME are trademarks of Sun Microsystems, Inc. of Santa Clara, Calif.), BREW (BREW is a registered trademark of Qualcomm Incorporated of San Diego, Calif.), Windows Mobile (Windows is a registered trademark of Microsoft Corporation of Redmond, Wash.), Palm OS (Palm is a registered trademark of Palm, Inc. of Sunnyvale, Calif.), Symbian OS (Symbian is a registered trademark of Symbian Software Limited Corporation of London, United Kingdom), ANDROID OS (ANDROID is a registered trademark of Google, Inc. of Mountain View, Calif.), and iPhone OS (iPhone is a registered trademark of Apple, Inc. of Cupertino, Calif.), and Windows Phone 7. "Mobile Apps" refers to software programs written for execution with Mobile Software.

Figure 1:
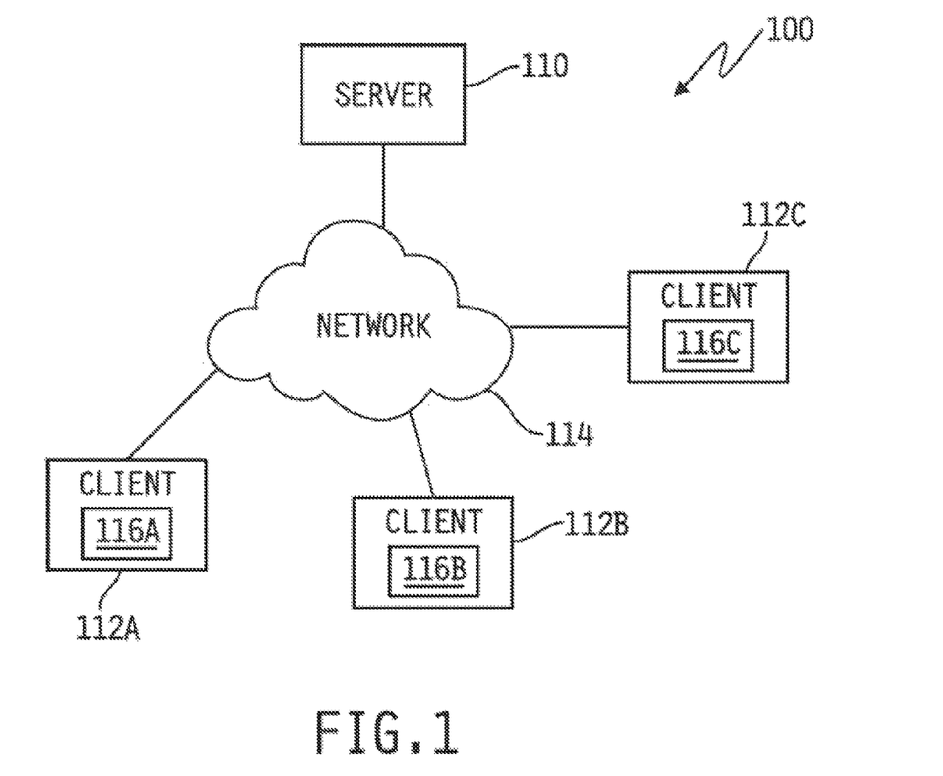
FIG. 1 is a schematic diagrammatic view of a network system in which embodiments of the present invention may be utilized.

FIG. 1 is a generalized high-level block diagram of one embodiment of a computing environment 100, illustrating server 110 and three clients 112a, 112b and 112c connected by network 114. Only three clients 112 are shown in FIG. 1 in order to simplify and clarify the description. Embodiments of the computing environment 100 may have thousands or millions of clients connected to network 114, for example the Internet. Users (not shown) may operate software 116a, 116b, and 116c on respective ones of clients 112a, 112b and 112c to both send and receive messages network 114 via server 110 and its associated communications equipment and software (not shown).

Figure 2:
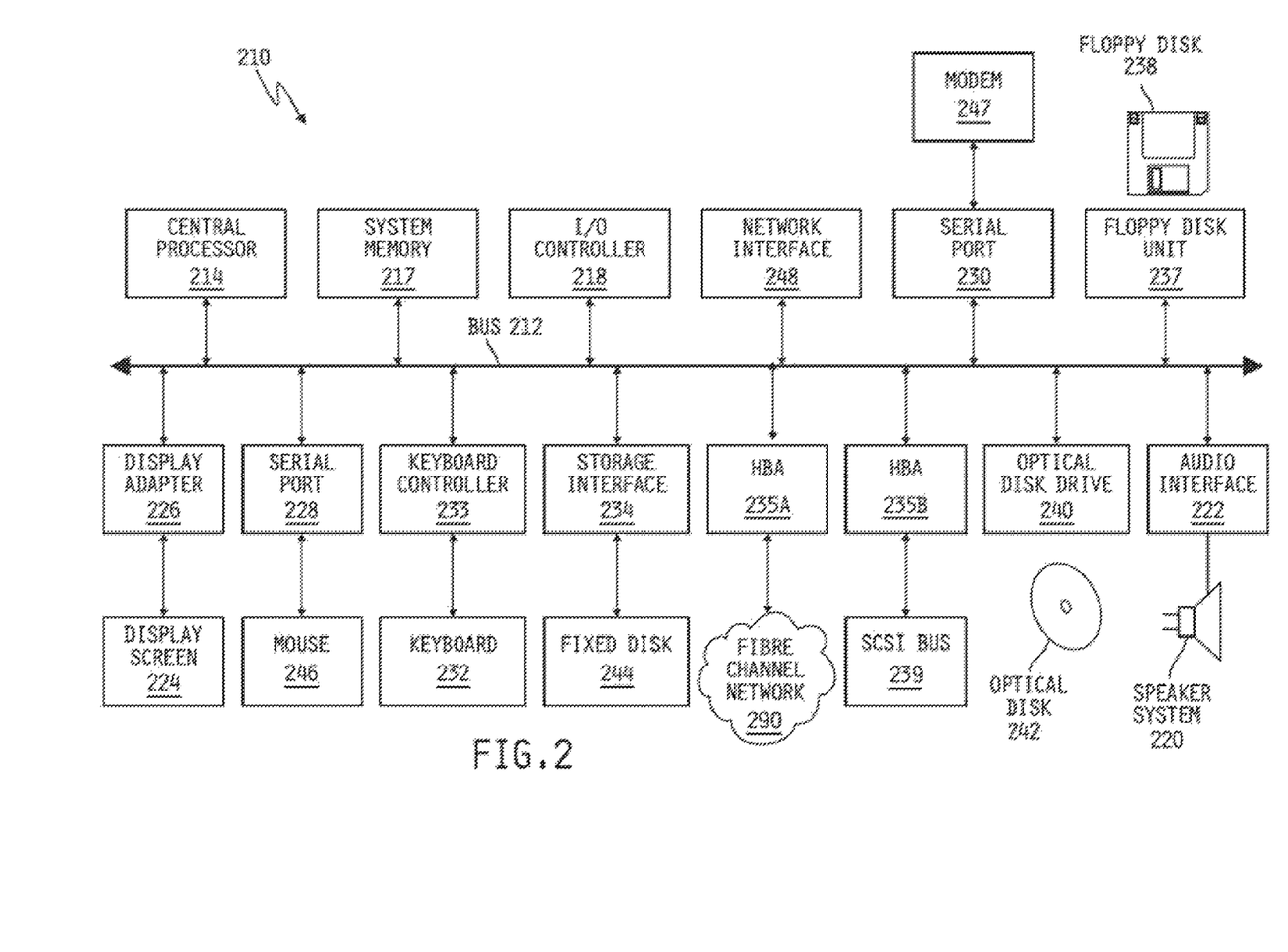
FIG. 2 is a block diagram of a computing system (either a server or client, or both, as appropriate), with optional input devices (e.g., keyboard, mouse, touch screen, etc.) and output devices, hardware, network connections, one or more processors, and memory/storage for data and modules, etc. which may be utilized as controller and display in conjunction with embodiments of the present invention.

FIG. 2 depicts a block diagram of computer system 210 suitable for implementing server 110 or clients 112a, 112b and 112c. Computer system 210 includes bus 212 which interconnects major subsystems of computer system 210, such as central processor 214, system memory 217 (typically RAM, but which may also include ROM, flash RAM, or the like), input/output controller 218, external audio device, such as speaker system 220 via audio output interface 222, external device, such as display screen 224 via display adapter 226, serial ports 228 and 230, keyboard 232 (interfaced with keyboard controller 233), storage interface 234, disk drive 237 operative to receive floppy disk 238, host bus adapter (HBA) interface card 235A operative to connect with Fiber Channel network 290, host bus adapter (HBA) interface card 235B operative to connect to SCSI bus 239, and optical disk drive 240 operative to receive optical disk 242. Also included are mouse 246 (or other point-and-click device, coupled to bus 212 via serial port 228), modem 247 (coupled to bus 212 via serial port 230), and network interface 248 (coupled directly to bus 212).

Bus 212 allows data communication between central processor 214 and system memory 217, which may include read-only memory (ROM) or flash memory (neither shown), and random access memory (RAM) (not shown), as previously noted. RAM is generally the main memory into which operating system and application programs are loaded. ROM or flash memory may contain, among other software code, Basic Input-Output system (BIOS), which controls basic hardware operation such as interaction with peripheral components. Applications resident with computer system 210 are generally stored on and accessed via computer readable media, such as hard disk drives (e.g., fixed disk 244), optical drives (e.g., optical drive 240), floppy disk unit 237, or other storage medium. Additionally, applications may be in the form of electronic signals modulated in accordance with the application and data communication technology when accessed via network modem 247 or interface 248 or other telecommunications equipment (not shown).

Storage interface 234, as with other storage interfaces of computer system 210, may connect to standard computer readable media for storage and/or retrieval of information, such as fixed disk drive 244. Fixed disk drive 244 may be part of computer system 210 or may be separate and accessed through other interface systems. Modem 247 may provide direct connection to remote servers via telephone link or the Internet via an Internet service provider (ISP) (not shown). Network interface 248 may provide direct connection to remote servers via direct network link to the Internet via a POP (point of presence). Network interface 248 may provide such connection using wireless techniques, including digital cellular telephone connection, Cellular Digital Packet Data (CDPD) connection, digital satellite data connection or the like.

The terms "marker," "tracker" and "image information" have particular meanings in the present disclosure. For purposes of the present disclosure, the term "tracking marker" refers to an object or reference that may be perceived by a sensor, where the sensor may be an optical sensor, a radio frequency identifier (RFID), a sonic motion detector, an ultra-violet or infrared sensor. The term "tracker" refers to a device or system of devices able to determine the location of the markers and their orientation and movement continually in 'real time'. As an example of a possible implementation, if the markers are composed of printed targets then the tracker may include a stereo camera pair. The term "image information" is used in the present specification to describe information obtained by the tracker, whether optical or otherwise, and usable for determining the location of the markers and their orientation and movement continually in 'real time'. The term "imaging set" is used here to describe the subjects to be imaged, their surroundings to be imaged, as well as the imaging devices with which to do the imaging. By way of example, on a movie set the imaging set comprises everything that is to be imaged and all cameras employed in the imaging. The term "subject" is used here in the context of an imaging set to describe an object, including for example without limitation a person, that is the subject of imaging by an imaging device. The imaging device may be, for example a video camera, cinematographic camera or a still camera or any other imaging device, and may be located on the imaging set where it is used to image the subject, which subject may vary from time to time and which subject may move. Such changes and movement create a need for the adjustment of the focus settings of the imaging device. The term "focus setting" or "focus settings" is used here to describe not just the focal length of the lens of the imaging device or its focal distance, but also the f-number of the lens, as the latter affects the depth of focus. The term "focus setting" or "focus settings" is therefore used to encompass both focal distance and depth of focus.

Figure 3:
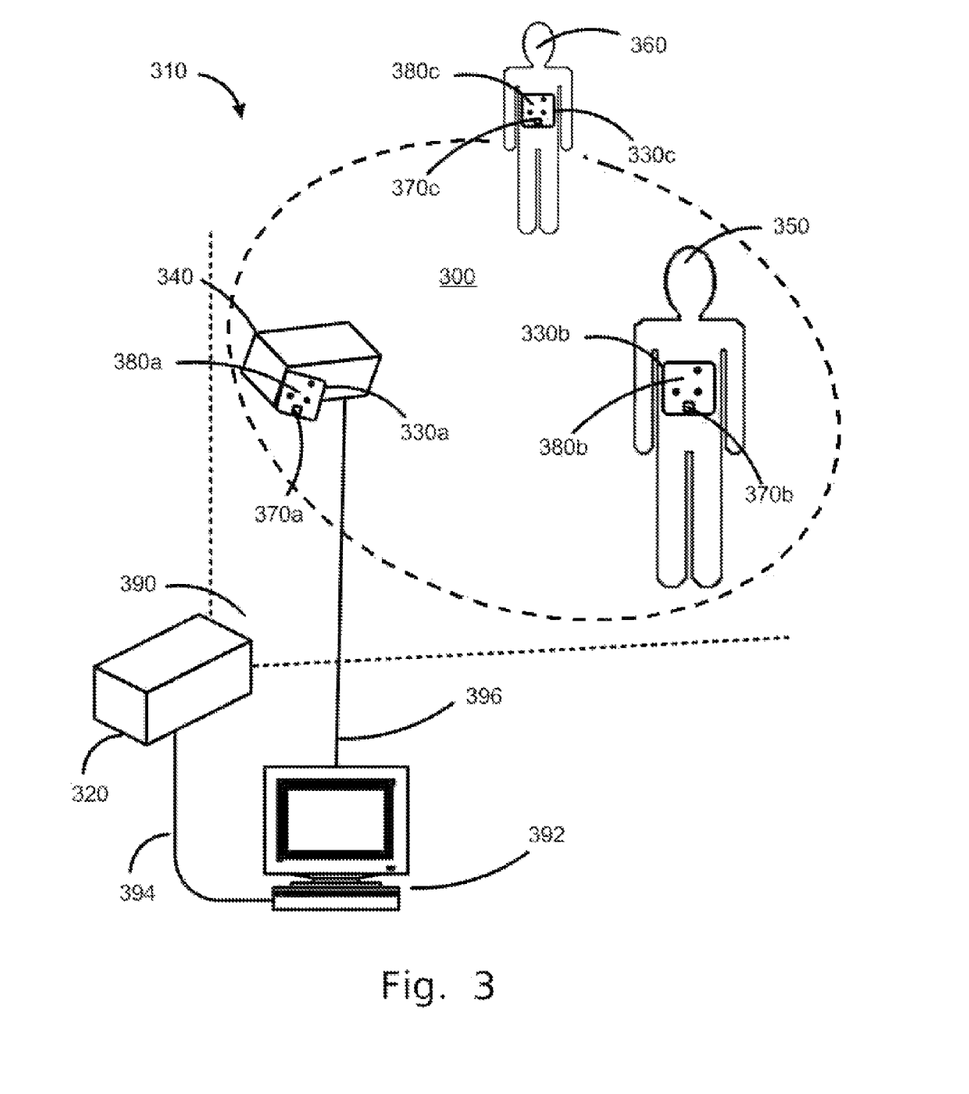
FIG. 3 is a schematic drawing of a system for autofocusing of imaging devices according to the present invention.

In a first aspect of the present invention an autofocus system for maintaining the focus of one or more imaging devices on one or more subjects on imaging set 300 is provided. As shown in FIG. 3, autofocus system 310 comprises first tracker 320 and one or more tracking markers 330*a*, 330*b*, and 330*c* located respectively on, for example, imaging device 340, first subject 350, and second subject 360, all within line of sight of first tracker 320. It is to be noted that, as part of the present invention, more than one imaging device may be present on imaging set 300. For the sake of clarity, only one imaging device is shown in FIG. 3. Any further imaging devices on imaging set 300 also bear tracking markers of the same type as tracking markers 330*a*, 330*b*, and 330*c*. Tracking markers 330*a*, 330*b*, and 330*c* each comprises a respective identification means 370*a*, 370*b*, and 370*c*, which, by way of non-limiting example, may be a distinct pattern, code or number by which to differentiate the specific one of tracking markers 330*a*, 330*b*, and 330*c*. Each of tracking markers 330*a*, 330*b*, and 330*c* comprises a respective location tracking pattern 380*a*, 380*b*, and 380*c*. In the embodiment shown in FIG. 3, the tracking patterns are distinct from the identification patterns, but in other embodiments location tracking patterns 380*a*, 380*b*, and 380*c* may be the same patterns as identification means 370*a*, 370*b*, and 370*c* and may be mutually distinct.

First tracker 320 is disposed proximate imaging set 300 to collect image information regarding imaging set 300 within a field of view 390 of first tracker 320, the image information comprising information about tracking markers 330*a*, 330*b*, and 330*c*, and, yet more particularly, information about location tracking patterns 380*a*, 380*b*, and 380*c* and identification means 370*a*, 370*b*, and 370*c*. Controller 392 is in communication with first tracker 320 via communication link 394 in order to receive from tracker 320 the image information about imaging set 300. Communication link 394 may be wired or wireless. Controller 392 may be, for example, processor 214 and memory 217 of computer 210 of FIG. 2. Controller 392 may be in communication with imaging device 340 via imaging control line 396, which may be wired or wireless.

Identification means 370*a*, 370*b*, and 370*c* may either be interpreted via the image information about imaging set 300 received from tracker 320, or may be obtained via a separate tracking marker identification system (not shown). Suitable alternative tracking marker identification systems include, but are not limited to, Radio Frequency Identification (RFID) systems, in which case the identification means 370*a*, 370*b*, and 370*c* may be suitable mutually distinct RFID tags.

Tracking patterns 380*a*, 380*b*, and 380*c* may be visible to the human eye and thereby first tracker 320 may employ suitable visible light sensors. However, there may be objections to the use of visible tracking patterns for aesthetic reasons. For this reason, tacking patterns 380*a*, 380*b*, and 380*c* may be made to be distinct only at wavelengths of light that are invisible to the human eye, such as infrared radiation. To this end, first tracker 320 may comprise a suitable infrared illuminator, or a suitable infrared flood illuminator (not shown) may be provided separately to illuminate imaging set 300. Suitable infrared illuminators are well known to those skilled in the art, and Si-based sensors are inherently sensitive to the near infrared by virtue of the electronic bandgap of Single crystal Si.

We consider now a single tracking pattern, which we take for example to be tracking pattern 380*b*. In one embodiment, tracking pattern 380*b* comprises a plurality of contrasting portions. At least one of the contrasting portions may have a perimeter comprising a mathematically describable curved section. The perimeter of the at least one contrasting portion may comprise a conic section, which conic section may be, for example, an ellipse or a circle. Associated tracking marker 330*b* may be substantially planar, and it may be flexible to allow it to return to planarity after being flexibly deformed. Tracking pattern 380*b* may be rotationally asymmetrical, so that an image of tracking pattern 380*b* inherently identifies the rotational orientation about an axis perpendicular to the plane of tracking pattern 380*b* of tracking marker 330*b*. Individual tracking marker 330*b* may comprise a plurality of tracking patterns 380*b* attached to or pasted onto tracking marker 330*b*.

FIG. 4 shows suitable examples of tracking marker 330*b* bearing various implementations of tracking pattern 380*b*. Tracking markers 330*a*, 330*b* and 330*c* and their operation and use are described in more detail in co-pending U.S. patent application Ser. No. 13/713,165 filed Dec. 13, 2012, and titled "System and method for determining the three-dimensional location and orientation of identification markers", published as U.S. Patent Publication No. 2014/0126767 A1, which is hereby incorporated by reference in full. The basis of the contrast is limited only in that the contrast has to be discernible by tracker 320 employed in system 310 of embodiments of the present invention. For example without limitation, the contrast with surrounding areas on tracking marker 330b may be by virtue of contrasting portion 382 being a cutout, by virtue of contrasting portion 382 being a darker or lighter greytone, by virtue of contrasting portion 382 being a different hue or saturation, by virtue of contrasting portion 382 being a different color in any color space, by virtue of contrasting portion 382 being a different brightness in an infrared image, or any other basis of image contrast.

Figure 4A:
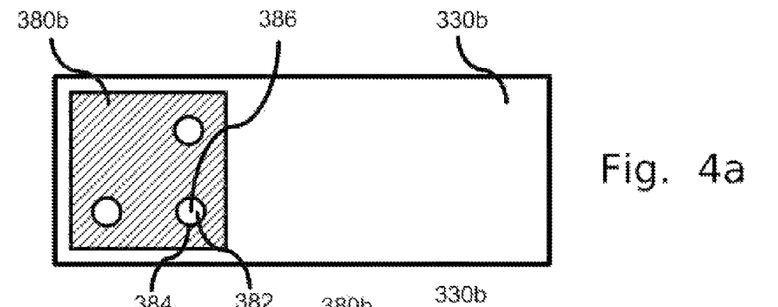
FIGS. 4a, 4b, 4c and 4d are drawings of suitable example tracking markers for use with the present invention, each showing a different tracking pattern.
Figure 4B:
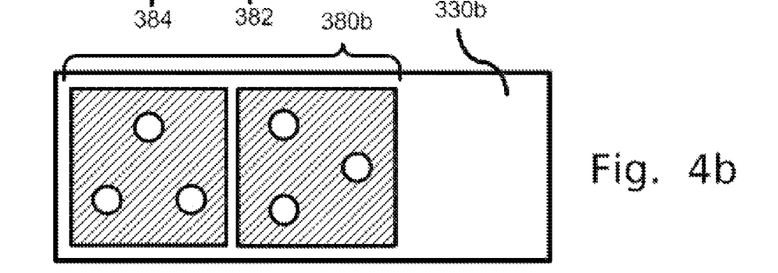
Figure 4C:
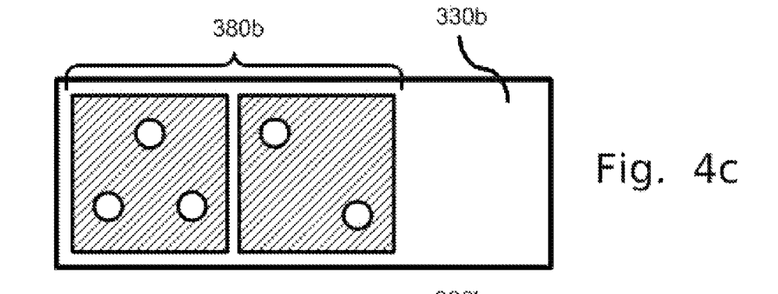
Figure 4D:
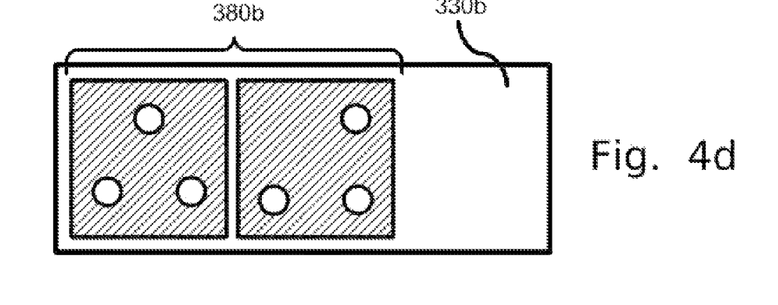

In FIG. 4a tracking pattern 380b comprises three contrasting portions 382, each having perimeter 384 comprising a mathematically describable curved section, which in this example is a circle with center 386. In FIG. 4b and FIG. 4c, tracking pattern 380b is shown as comprising two sub-patterns, each of which has rotational symmetry, but which, when combined, has no rotational symmetry. FIG. 4d shows an implementation of tracking pattern 380b in which a pattern with rotational symmetry is combined with one that has no symmetry. The combination provides more a larger number of contrasting portions and thereby greater opportunity for the tracker to identify the pattern.

The mathematically describable curved section of perimeter 384 of contrasting portion 382 provides a number of distinct benefits. Firstly, it overcomes the inherent problem of straight-edged shapes such as squares, rectangles, and parallelograms which exacerbate problems stemming from the finite number and size of pixels available in typical trackers, such as the tracker used in the several embodiments of the present invention. Due to the fact that the pixels have a finite size, the determination of the exact location of a straight line in an image is difficult to do to an accuracy of less than one pixel. A contrasting portion with a straight-line section to its perimeter would inherently suffer from this limitation. By employing a mathematically describable curved section as perimeter 384 of contrasting portion 382 the location of perimeter 384 may inherently be determined more accurately. We do not dwell here upon the methods of determining contrast boundaries in digital images, as the concepts and methods are well described in the art and well known to practitioners of the art.

Secondly, in addition to the aforementioned more accurate determination of the location of the perimeter, the mathematically describable nature of the curve of perimeter 384 allows a single very accurate contrasting portion reference point 386 to be determined once an image of pattern 380b is available, showing its contrasting portion 382 and perimeter 384. By way of the circular example of FIG. 4a, a useful choice for contrasting portion reference point 386 may be the center of the circle described by perimeter 384, which in this case is the center of contrasting portion 382. However, in a more general case, a point other than the center of the circle may be employed as reference to suit the application.

Thirdly, with the mathematical description of a section of perimeter 384 of contrasting portion 382 known, the rotation of pattern 380b about further axes may be determined. To this end, the appearance of pattern 380b may be expressed in mathematical terms and stored in a database of any kind, including without limitation a digital database. The tracker of the monitoring system may obtain image information about pattern 380b on tracking marker 330b. By analyzing the image information mathematically using controller 392 of FIG. 3 and comparing with the stored information about the mathematical description of pattern 380b, the three-dimensional orientation of tracking marker 330b may be determined. If tracking marker 330b has a large enough three-dimensional extent, then suitable patterns of contrasting portions may also be applied to further surfaces of tracking marker 330b to assist in determining the three-dimensional orientation of tracking marker 330b.

In other embodiments of the invention, a plurality of trackers similar to tracker 320 may be employed in system 310. This may provide different views of imaging set 300 in order to ensure that all tracking markers employed are within the field of view of at least one tracker. In yet further embodiments, more than one tracker may be employed to track a single tracking marker, with the trackers disposed proximate imaging set 300 to ensure that at least one of the trackers has the tracking marker within its field of view at all times.

The autofocus system further comprises a database stored in a memory associated with controller 392, which memory may be memory 217 of computer 210 of FIG. 2. The database comprises information on patterns 380a, 380b, and 380c of tracking markers 330a, 330b, and 330c and the identities of those markers. The unique nature of the patterns, along with their lack of rotational symmetry, makes it possible for controller 392 to compare any pattern 380a, 380b, and 380c of tracking markers 330a, 330b, and 330c with the data stored in the database and to not only identify the marker or markers in question, but to also determine their distance from tracker 320 and their orientation, if so required. Moreover, when a plurality of trackers are employed, they can each determine the same information concerning tracking markers 330a, 330b, and 330c as perceived from their respective locations proximate imaging set 300.

With the identity and location of each of tracking markers 330a, 330b, and 330c known to controller 392, controller 392 has all the required information to compute the relative three-dimensional positions and orientations of imaging device 340, first subject 350, and second subject 360. Controller 392 thereby obtains the distance to which imaging device 340 has to be focused to sharply image first subject 350, and second subject 360, the two distances in general requiring different focus settings. A control program software loaded into memory 217 of controller 392 (that is, computer 210 of FIG. 2) may be executed by controller 392 to direct imaging device 340 to focus on either first subject 350, or on second subject 360, or may instruct imaging device 340 to increase the f-number of its lens system in order to increase the depth of focus to encompass having both first subject 350 and second subject 360 in focus.

As already explained, there may be a plurality of trackers disposed proximate imaging set 300 to track imaging device 340, first subject 350, and second subject 360 and each of the trackers may provide image information to controller 392 to allow it to track the various tracking markers, images and subjects. In general, there may also be a plurality of imaging devices, similar to imaging device 340, and bearing suitable tracking markers. The image information about imaging set 300 provided by the various trackers therefore inherently will contain information to allow controller 392 to determine the positions and orientations of such imaging devices. Controller 392 may therefore determine the distance between any subject and any imaging device within imaging set 300. This allows controller 392 to direct the focusing of each of the plurality of imaging devices in real time.

Figure 5:
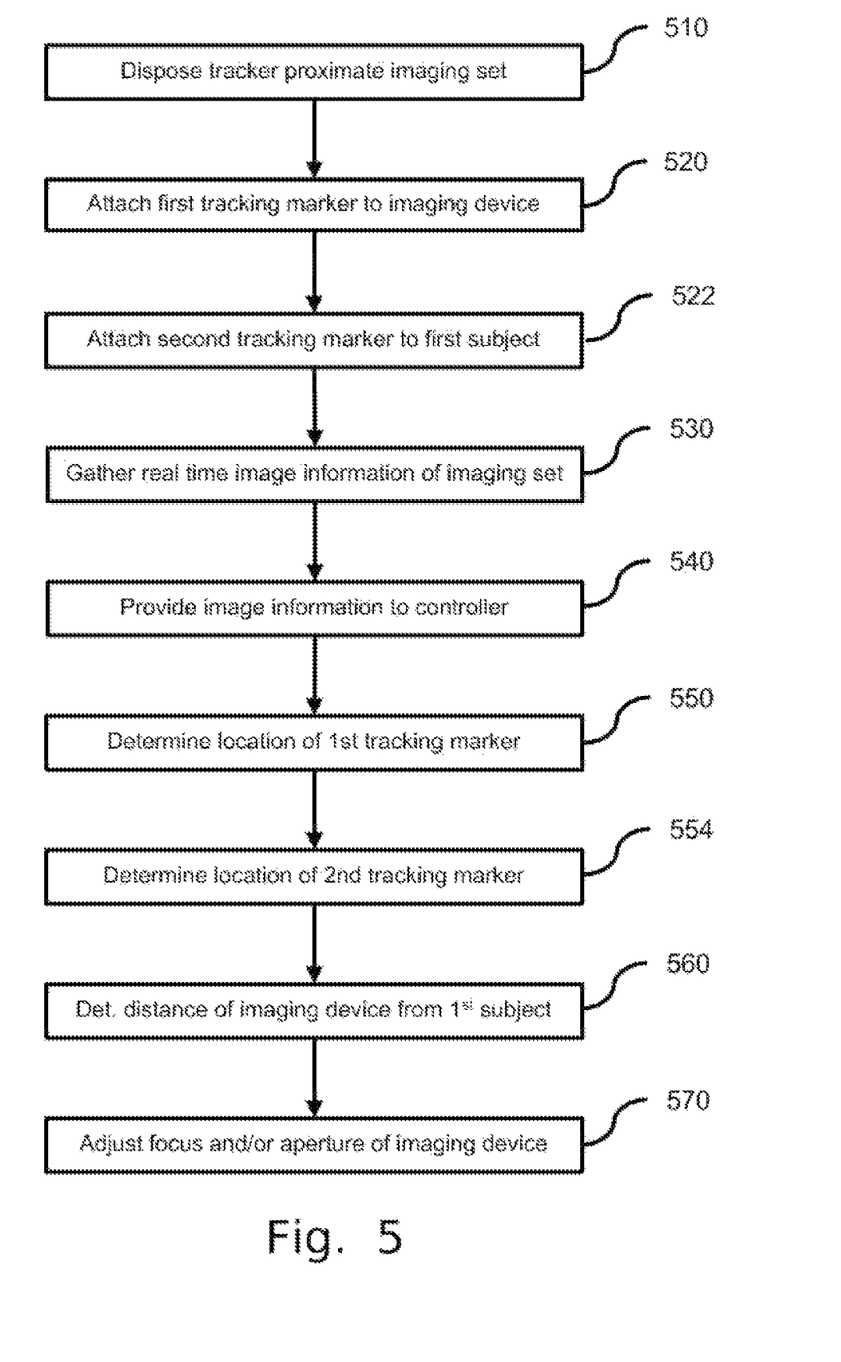
FIG. 5 gives a flow chart of an embodiment of a method for the autofocusing of an imaging device

In another aspect of the invention, described at the hand of FIG. 3 and the flow chart in FIG. 5, a method is provided for focusing imaging device 340 disposed within imaging set 300, the method comprising disposing [510] proximate the imaging set tracker 320 configured for identifying and tracking markers; attaching [520] first tracking marker 330a to imaging device 340; attaching [522] second tracking marker 330b to first subject 350; gathering [530] real time image information of imaging set 300 by means of tracker 320; providing [540] the image information to controller 392; determining [550] from the image information the three-dimensional location of first tracking marker 330a; determining [554] from the image information the three-dimensional location of second tracking marker 330b; determining [560] from the location of first tracking marker 330a and the location of second tracking marker 330b the distance $D_1$ between imaging device 340 and first subject 350; and adjusting [570] on the basis of the distance between imaging device 340 and first subject 350 at least one of a focus of imaging device 340 to a first focus setting and an optical aperture of imaging device 340 to a first aperture setting.

Figure 6:
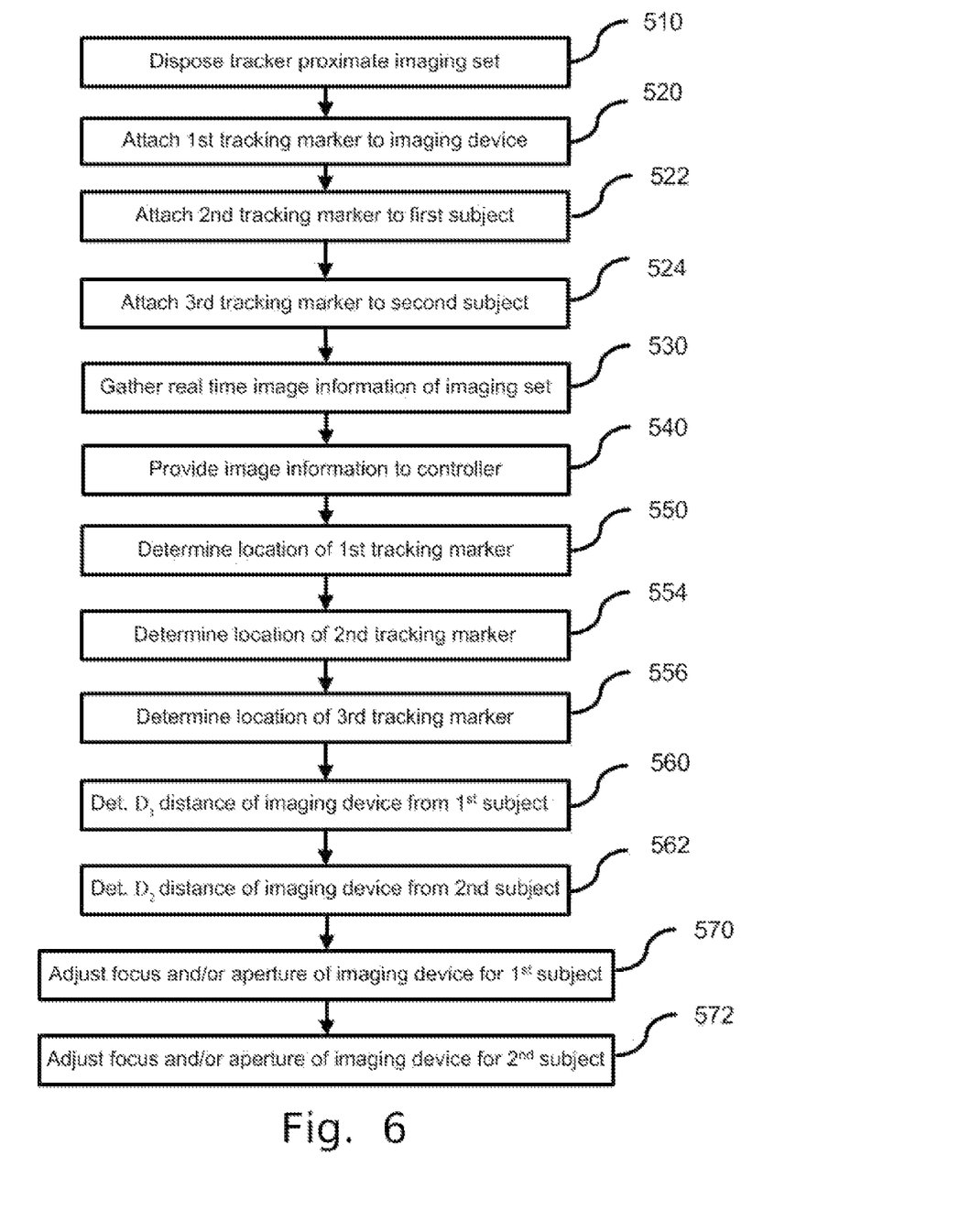
FIG. 6 is a flow chart of another embodiment of a method for the autofocusing of an imaging device.

As shown in the flow chart of FIG. 6, the method may further comprise attaching [524] third tracking marker 330c to second subject 360 and; determining [556] from the image information the three-dimensional location of third tracking marker 330b; and determining [562] from the location of first tracking marker 330a and the location of third tracking marker 330c the distance $D_2$ between imaging device 340 and second subject 360; and adjusting [572] on the basis of the distance between imaging device 340 and second subject 350 at least one of the focus of imaging device 340 to a second focus setting and the optical aperture of imaging device 340 to a second optical aperture setting.

Figure 7:
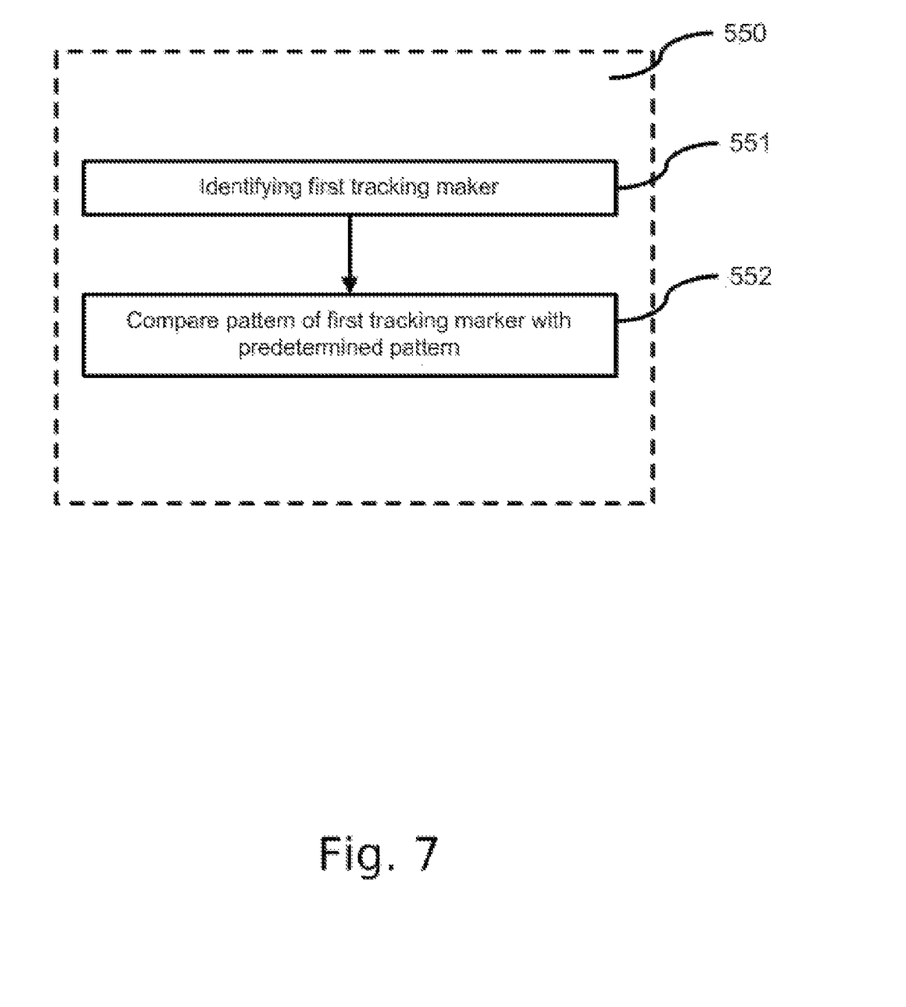
FIG. 7 is a flow chart expanding on the method of FIG. 6 and shows detail of a method for determining the position of a tracking marker

As shown in the flow chart of FIG. 7, the determining [550] from the image information the three-dimensional location of first tracking marker 330a may comprise identifying [551] first tracking marker 330a based on at least one of identification means 370a or pattern 380a and comparing [552] an image of pattern 380a obtained from the image information with predetermined information about pattern 380a stored in a memory associated with controller 392, which memory may be memory 217 of computer 210 of FIG. 2. The determining from the image information the three-dimensional location of any of the other tracking markers may be achieved in the same way using their respective image information and respective predetermined information stored in memory.

Figure 8:
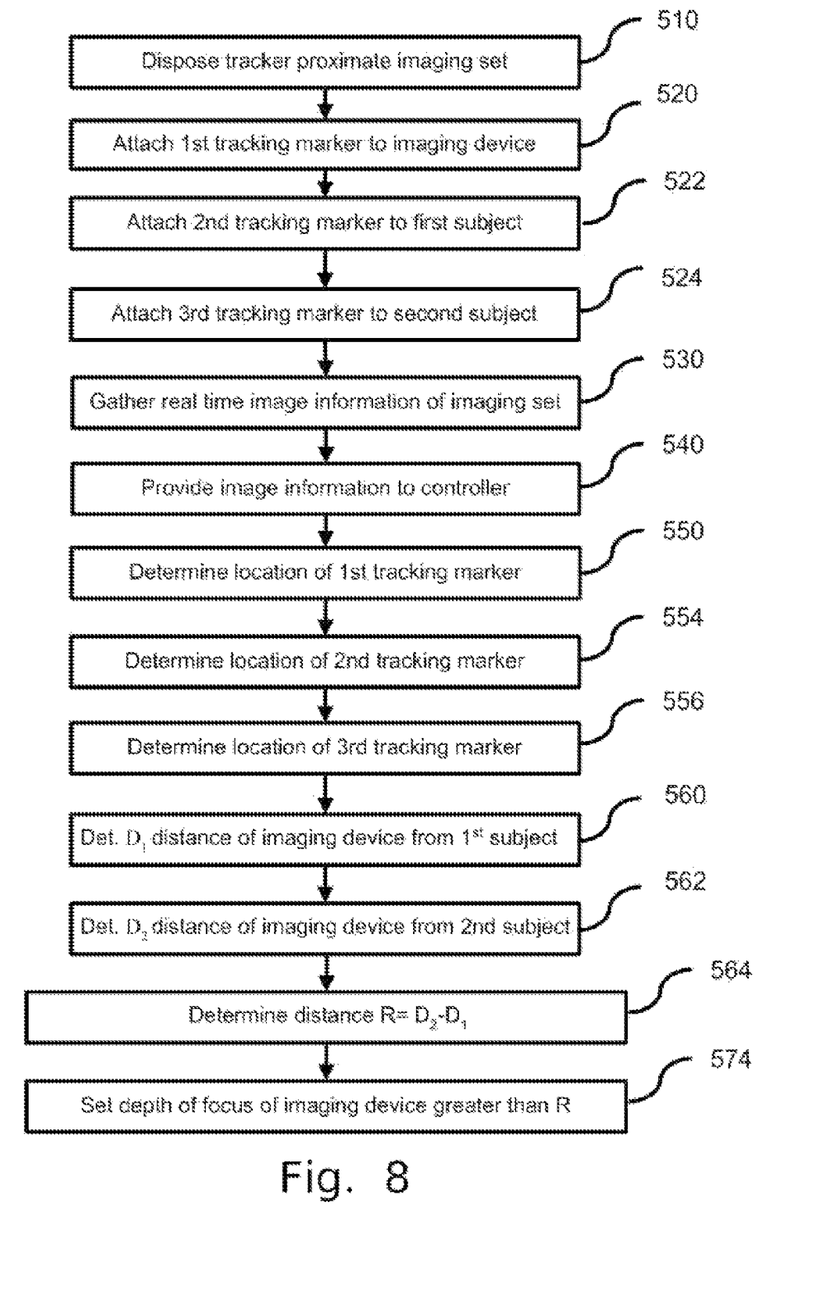
FIG. 8 is a flow chart of another embodiment of a method for the autofocusing of an imaging device.

In another embodiment, shown in the flow chart of FIG. 8, the method may comprise determining [564] from the location of second tracking marker 330b and the location of third tracking marker 330c the difference $R=D_2-D_1$; and adjusting [574] the optical aperture of imaging device 340 to an optical aperture setting that provides a depth of focus that exceeds R.

In a further embodiment of the method, the method may comprise disposing proximate imaging set 300 a plurality of trackers configured for identifying and tracking markers; attaching markers to one or more imaging devices and to one or more subjects; gathering real time image information of imaging set 300 by means of the plurality of trackers; providing the image information so gathered to controller 392; determining from the different groups of image information the three-dimensional locations of the various imaging devices and subjects; determining from the image information the three-dimensional locations of every imaging device and every subject; determining from the three-dimensional locations the distance of the various subjects from the various imaging devices; and adjusting on the basis of the distances so determined at least one of the focus and the optical aperture of each imaging device.

In a further embodiment, described at the hand of FIG. 3, tracker 320 may be attached to imaging device 340, or integrated with imaging device 340, or may be a subsystem of imaging device 340 itself or a view-finding subsystem of imaging device 340. In such an embodiment the tracking subsystem of imaging device 340 communicates the image information of imaging set 300 to controller 392 or to a built-in controller, which then directs a focusing subsystem of imaging device 340 as already described above. In such a configuration, where imaging device 340 itself or a view-finding subsystem of imaging device 340 functions as tracker 320, one or more of tracking markers 330b and 330c may very well be out of focus. The location of relevant tracking marker(s) 330b and 330c may be determined with good accuracy even from an unfocused image of the marker(s). Despite the defocused images of tracking markers 330b and/or 330c, this method therefore still allows focusing control of imaging device 340 with respect to subjects 350 and 360.

In this embodiment the system for automatically adjusting the focus setting of the imaging device on the imaging set comprises one or more tracking markers, each tracking marker comprising an identification means and a tracking pattern, the one or more tracking markers configured for attaching to corresponding one or more subjects to be imaged on the imaging set by the at least one imaging device; a first tracker integrated with the imaging device to gather first image information of the imaging set, the first tracker having a field of view including the one or more subjects; a controller configured for receiving the first image information from the first tracker and for communicating to the imaging device control signals for the adjusting of focus settings for the imaging device based on distances between the imaging device and the one or more subjects; and a database comprising predetermined information about one or more corresponding identities and one or more corresponding tracking patterns of the one or more tracking markers.

The controller may be further configured for communicating the control signals based on the distances between the imaging device and the one or more subjects. The controller may also be further configured for comparing the first image information with the predetermined information; identifying from the first image information the one or more tracking markers; determining three-dimensional locations of the one or more tracking markers; and determining distances between the at least one imaging device and the one or more subjects. The one or more subjects may comprise two or more subjects and the controller may be further configured for determining a required depth of focus from the distances between the imaging device and the two or more subjects, and for communicating the control signals based on the required depth of focus for the at least one imaging device.

With the imaging device functioning as tracker in this embodiment, the associated method for automatically adjusting a focus setting of the imaging device on the imaging set comprises attaching one or more tracking markers to corresponding one or more subjects on the imaging set, each tracking marker comprising an identification means and a tracking pattern; disposing the imaging device to have a field of view to include the one or more tracking markers on the imaging set; obtaining from the imaging device first image information of the imaging set; determining focus settings for the imaging device based on the first image information and predetermined information in a database about one or more identities and one or more tracking patterns corresponding to the one or more tracking markers; adjusting the imaging device based on the focus settings. As already described above, the determining of the three-dimensional locations of the one or more tracking markers may comprise determining a contrasting portion reference point for each of the one or more tracking markers.

The determining of the focus settings for the imaging device may comprise: identifying from the first image information the two or more tracking markers; determining the three-dimensional locations of the two or more tracking markers; determining distances between the imaging device and the one or more subjects; and determining the focus settings for the imaging device based on the distances between the imaging device and the one or more subjects. The method may further comprise determining a required depth of focus for the imaging device from the distances between the imaging device and the one or more subjects, and adjusting the imaging device the control signals based on the required depth of focus.

The method may further comprise disposing at least one tracker proximate the imaging set; configuring the at least one tracker to have a field of view including the one or more tracking markers; gathering from the at least one tracker further image information of the imaging set; determining further focus settings for the imaging device based on the further image information and predetermined information in a database about the one or more identities and the one or more tracking patterns corresponding to the one or more tracking markers; and adjusting the imaging device based on the further focus settings.

In yet further embodiments, the method may comprise assigning different trackers to track different tracking markers and thereby track the different imaging devices or subjects such tracking markers are attached to.

In yet further embodiments the method may comprise illuminating the imaging set with radiation of a specific wavelength or range of wavelengths and using the light of that wavelength or range of wavelengths reflected from the tracking markers to identify and track the tracking markers.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A system for automatically adjusting a focus setting of an imaging device on an imaging set, the system comprising:
    one or more tracking markers, each tracking marker comprising an identification means and a tracking pattern, the one or more tracking markers configured for attaching to corresponding one or more subjects to be imaged on the imaging set by the at least one imaging device;
    a first tracker integrated with the imaging device to gather first image information of the imaging set, the first tracker having a field of view including the one or more subjects;
    a controller configured for receiving the first image information from the first tracker and for communicating to the imaging device control signals for the adjusting of focus settings for the imaging device based on distances between the imaging device and the one or more subjects; and
    a database comprising predetermined information about one or more corresponding identities and one or more corresponding tracking patterns of the one or more tracking markers.

2. The system of claim 1, wherein the controller is further configured for communicating the control signals based on the distances between the imaging device and the one or more subjects.

3. The system of claim 2, wherein the controller is further configured for comparing the first image information with the predetermined information; identifying from the first image information the one or more tracking markers; determining three-dimensional locations of the one or more tracking markers; and determining distances between the at least one imaging device and the one or more subjects.

4. The system of claim 3, wherein the one or more subjects comprise two or more subjects and the controller is further configured for
    determining a required depth of focus from the distances between the imaging device and the two or more subjects, and for
    communicating the control signals based on the required depth of focus for the at least one imaging device.

5. The method of claim 4, wherein the mathematically describable curved section is a circle, and determining a contrasting portion reference point comprises determining a centre of the circle.

6. The method of claim 4, wherein the mathematically describable curved section is an ellipse, and determining a contrasting portion reference point comprises determining a centre of the ellipse.

7. A method for automatically adjusting a focus setting of at least one imaging device on an imaging set, the method comprising:
    attaching two or more tracking markers to the at least one imaging device and to corresponding one or more subjects on the imaging set, each tracking marker comprising an identification means and a tracking pattern;
    disposing proximate the imaging set a first tracker to gather first image information of the imaging set;
    setting a field of view for the first tracker to include the at least one imaging device and the one or more tracking markers;
    supplying to a controller the first image information from the first tracker;
    determining focus settings for the at least one imaging device based on the first image information and predetermined information in a database about the two or more identities and two or more tracking patterns of the corresponding two or more tracking markers;
    communicating from the controller to the at least one imaging device control signals for the adjusting of the focus settings for the at least one imaging device.

8. The method of claim 7, wherein the determining focus settings for the at least one imaging device comprises:
    identifying from the first image information the two or more tracking markers;
    determining the three-dimensional locations of the two or more tracking markers;

determining distances between the at least one imaging device and the one or more subjects; and determining the focus settings for the at least one imaging device based on the distances between the at least one imaging device and the one or more subjects.

9. The method of claim 8, further comprising:

determining a required depth of focus for the at least one imaging device from the distances between the at least one imaging device and the two or more subjects, and communicating to the at least one imaging device the control signals based on the required depth of focus for the at least one imaging device.

10. The method of claim 9, wherein the at least one contrasting portion has a perimeter that comprises a mathematically describable curved section and determining a contrasting portion reference point for each of the two or more tracking markers comprises determining a contrasting portion reference point relative to the mathematically describable curved section.

11. The method of claim 8, wherein each tracking pattern comprises at least one contrasting portion and the determining the three-dimensional locations of the two or more tracking markers comprises determining a contrasting portion reference point for each of the two or more tracking markers.

12. The method of claim 7, further comprising:

disposing at least one further tracker proximate the imaging set;

setting the at least one further tracker to have a field of view including the two or more tracking markers;

gathering from the at least one further tracker further image information of the imaging set;

supplying to the controller the further image information from the at least one further tracker; and communicating to the at least one imaging device control signals for the adjusting of focus settings for the at least one imaging device based on distances between the at least one imaging device and the one or more subjects.

* * * * *